April 23, 1968     B. B. CORSON ET AL     3,379,768
METHOD OF PRODUCING HYDRATROPIC ALDEHYDE
Filed June 1, 1965
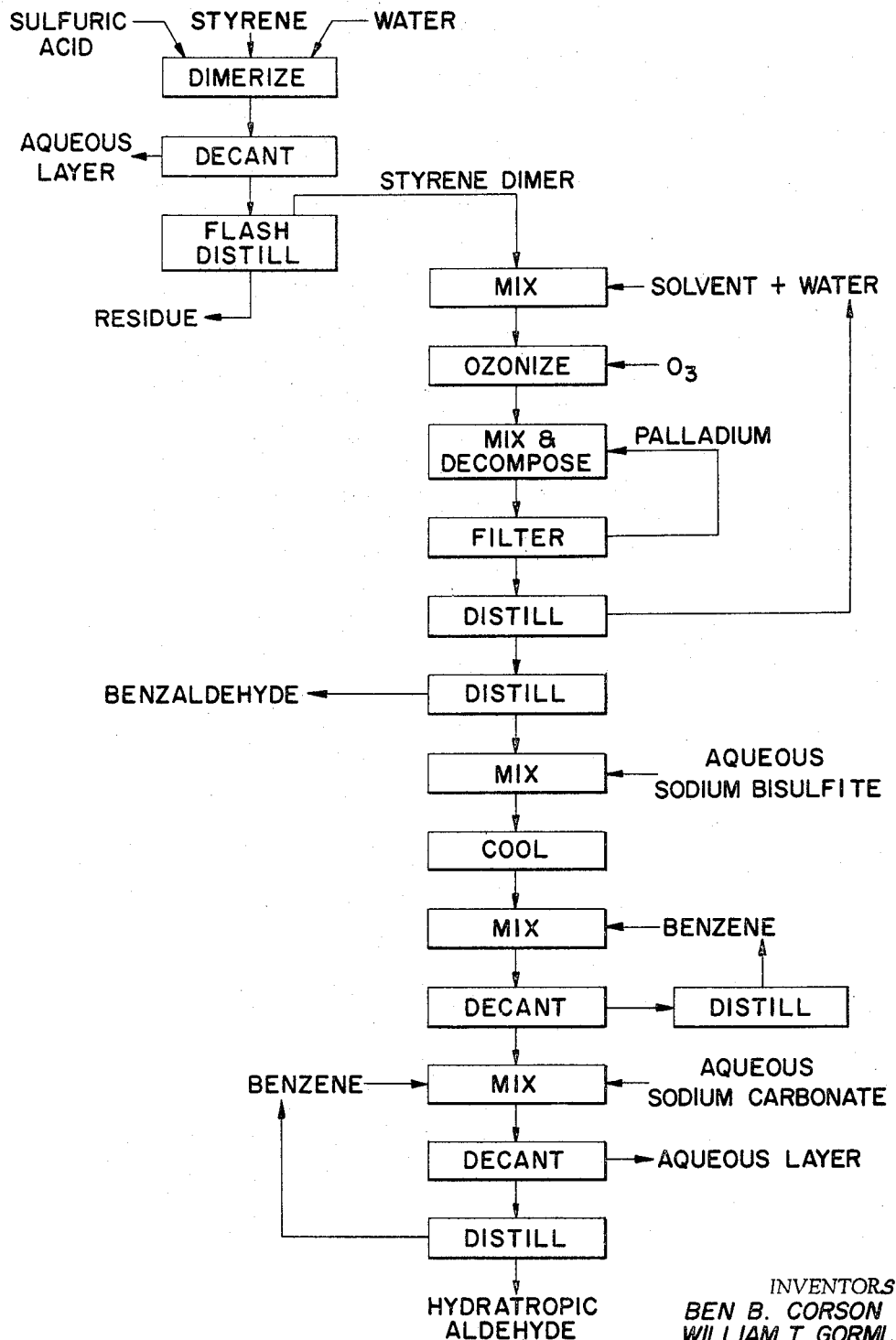
INVENTORS.
BEN B. CORSON &
WILLIAM T. GORMLEY
BY Oscar B. Brumback
their Attorney

United States Patent Office 3,379,768
Patented Apr. 23, 1968

3,379,768
METHOD OF PRODUCING HYDRATROPIC ALDEHYDE
Ben B. Corson and William T. Gormley, Pittsburgh, Pa., assignors to Koppers Company, Inc., a corporation of Delaware
Filed June 1, 1965, Ser. No. 460,173
7 Claims. (Cl. 260—599)

ABSTRACT OF THE DISCLOSURE

Hydratropic aldehyde is prepared by ozonizing the linear dimer of styrene and decomposing the ozonide with a palladium catalyst in an aqueous medium containing suitable organic solvents. The hydratropic aldehyde is separated from benzaldehyde, which is also produced by the present process, in a pure state suitable for use in perfumes.

---

This invention relates to a novel process for producing hydratropic aldehyde.

Hydratropic aldehyde is widely used in soap perfumes, and in aiding hyacinth effects, as well as in rose, jonquil, and lilac florals. Hydratropic aldehyde is variously known as hydratropaldehyde; alpha-methylphenyl acetaldehyde; 2-phenylpropanal; alpha-phenylpropionaldehyde and hyacinthal. It has the structural formula:

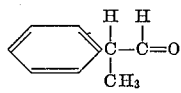

Conventionally, hydratropic aldehyde is produced by Darzens' synthesis as follows:

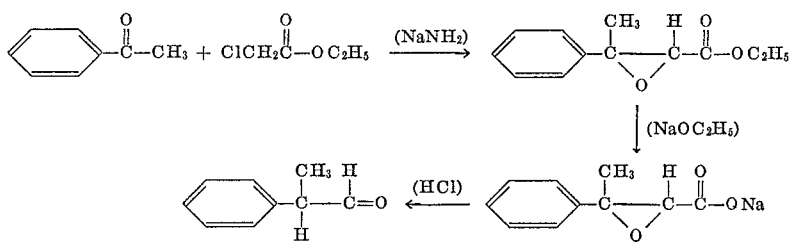

It has now been found that hydratropic aldehyde can be made with styrene as the starting material. The general process is illustrated schematically in the drawing by flow diagram.

In accordance with this invention, hydratropic aldehyde is made by dimerizing styrene, ozonizing the linear dimer, decomposing the ozonide to obtain benzaldehyde and hydratropic aldehyde, and separating the benzaldehyde from the hydratropic aldehyde.

The preparation of dimers of styrene is well-known. A preferred process is to catalyze the dimerization of styrene by means of aqueous sulfuric acid which process readily converts the styrene in 95–100% yield to a product whose major proportion is dimer and minor proportion is trimer. For example, there is readily obtained a product containing about 85% of dimer, and 15% of trimer, the dimer fraction being about 90% linear

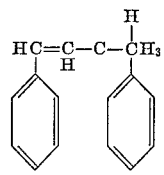

and 10% cyclic.

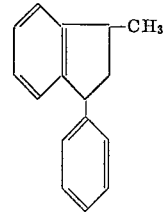

The dimer fraction is removed from the high boiling fractions (trimers) by flash distillation. The linear dimer can be separated from the cyclic dimer relatively easily by distillation, if desired, since the difference in boiling is approximately 13° C. and a substantially pure linear dimer can be obtained. It is only the linear dimer that takes part in the reaction in this invention and the presence of the cyclic dimer does not particularly influence the reaction.

To ozonize the linear dimer, ozonized oxygen is passed through the dimer in an aqueous medium containing a material selected from the class consisting of lower aliphatic alcohols, acids, and acetones wherein the alkyl group contains no more than 4 carbon atoms, tetrahydrofuran and dioxane. There should be present at least one mole of water per mole of linear dimer and desirably three or four moles of water per mole of linear dimer. The addition of ozone is continued until ozone is detected in the exit gas.

It is postulated that the linear dimer is ozonized in this reaction to the neutral ozonide C which is in equilibrium with zwitterion D and free aldehyde E and perhaps also with zwitterion F. The zwitterions D and F and the free aldehyde E, of course, represent undesirable side reactions.

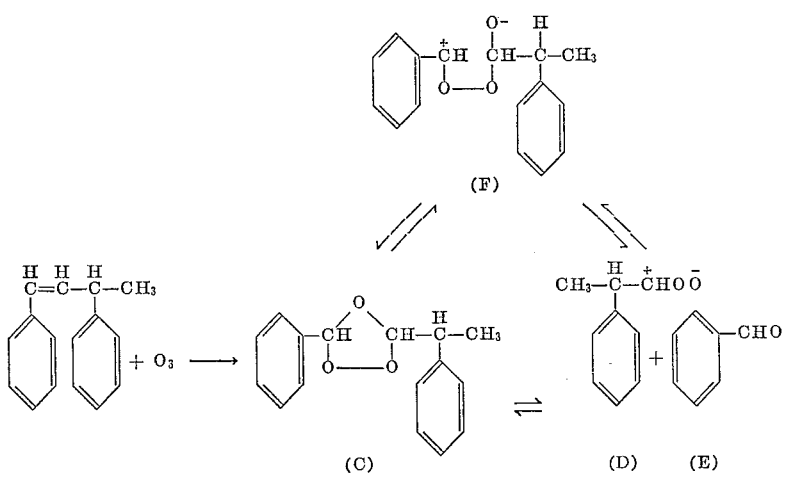

The decomposition of the ozonide produces hydratropic aldehyde. As is well known, ozonides can be decomposed by reduction, by hydrolysis or by catalysts.

In accordance with this invention, the decomposition of the ozonide is preferably accomplished catalytically in the presence of palladium and in the absence of hydrogen. The function of the palladium is to decompose hydrogen peroxide which results from the hydrolysis of the ozonide. It is surprising that oxidizable aldehyde can survive in the presence of hydrogen peroxide and an oxidizing catalyst such as palladium. A possible explanation is the double equilibrium involving D, the hydrogen peroxide being immediately decomposed as fast as it is liberated.

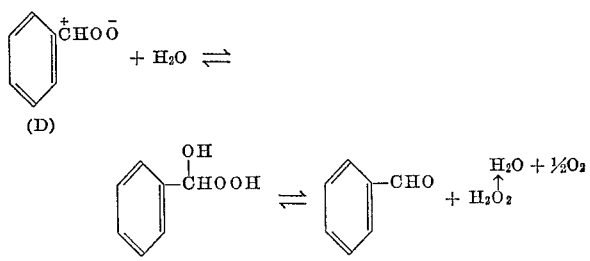

This equilibrium, however, does not explain the survival of aldehyde in the presence of oxygen and an oxidation catalyst. The decomposition of the ozonide liberates one atom of oxygen, which is sufficient to oxidize about half of the aldehyde to acid. It has been found that in practice only about 15% of the hydratropic aldehyde is unaccounted for, and half of this loss appears as acetophenone. On the other hand, the benzaldehyde that is formed escapes oxidation completely. A plausible explanation is that the hydratropic aldehyde acts as an oxidation buffer to protect the benzaldehyde.

The hydratropic aldehyde and the benzaldehyde are readily separable by distillation. The benzaldehyde that is produced is free of chlorine and, therefore, is a premium product suitable for use, for example, in a perfumery or in organic synthesis.

Acetophenone is an undesirable by-product. While hydratropic aldehyde can be separated by distillation from benzaldehyde, the boiling points of hydrotropic aldehyde and acetophenone are so close that they cannot be readily separated in this manner. They can, however, be separated readily through the use of sodium bisulfite, since acetophenone does not form an adduct with benzene sulfite whereas hydratropic aldehyde and benzaldehyde form water-soluble adducts from which the aldehydes can be regenerated by acidification or basification. Thus the separation is accomplished by reacting aqueous sodium bisulfite with a mixture of aldehyde and acetophenone to produce an aqueous solution of aldehyde adduct plus nonreactive acetophenone. The separation by means of bisulfite can precede or follow the distillation separation.

The acetophenone is removed by extraction, and the aldehyde regenerated from the adduct by the addition of an acid or a base. The preferred material for decomposing the adduct is sodium carbonate. The method of this invention affords a recovery of hydratropic aldehyde having better than 98% purity.

The invention will be illustrated further by the following examples:

EXAMPLE I

Styrene dimerization

A mixture of styrene ($d_4^{20}$ 0.907) and dilute sulfuric acid (100 parts of concentrated sulfuric acid and 150 parts of water) was stirred for 3½ hours at a temperature of 116–127° C. The mixture was cooled to 50° and held at this temperature for an hour. The mixture separated during this period into two layers, an upper hydrocarbon layer and a lower acid layer. The hydrocarbon layer was decanted, diluted with benzene and washed with aqueous sodium carbonate. The material upon standing separated into two layers again, an aqueous layer and a hydrocarbon layer. The hydrocarbon layer was separated and distilled to yield a dimer distillate. This distillate (found to be 88% linear and 12% cyclic dimer) can be used as it is or it can again be distilled to separate the linear isomer from the cyclic isomer. The linear isomer, of course, is the isomer which reacts to provide the hydratropic aldehyde.

Ozonation

A mixture was made of 118 grams of the foregoing 88–12 linear-cyclic dimer (0.50 mole of linear dimer), 735 milliliters of acetone and 80 milliliters of water. Ozonized oxygen (oxygen containing 2+% of ozone) was produced by a Welsbach Ozonator and fed to the mixture. With this 0.5 mole charge of linear dimer, the gas rate was 100 liters per hour which corresponds to about 0.09 mole of ozone per hour. The ozonizing of the mixture was carried out at a temperature of −20 to −15° C. until ozone was detected in the exit gas, a period of about five hours.

Ozonide decomposition

The ozonide mixture was added over a period of 15 minutes to a stirred slurry of 10 grams of 10–90 palladium-carbon catalyst in 80 milliliters of 1–3 water-acetone solution. The mixture was stirred for 10 minutes at 30° C., heated to reflux (61° C.) over a period of 10 minutes, then refluxed for 10 minutes; thereafter 415 mililiters of distillate was removed over a 50-minute period. During this time 5.25 liters of gas evolved (STP), or 94% of the theoretical. The mixture was filtered; the pale yellow filtrate was distilled using a 24-inch Vigreux column. About 370 milliliters of distillate was removed. A pot residue of two layers remained; the upper layer constituting 195 mililiters, and the lower residue layer 100 milliliters. This residue was then distilled in a 25-plate Podbielniak column at a 10:1 reflux ratio to a pot temperature of 189° C. (head temperature 80° C. at 735 milliliters). Analysis of the 132 gram bottoms from this distillation showed 4% benzene, 31% benzaldehyde, 34% hydratropic aldehyde, 2% acetophenone and 27.5% styrene dimers.

Purification of the hydratropic aldehyde

Hydratropic aldehyde (B.P. 204° C./760 mm.) is separable from benzaldehyde (B.P. 179° C./760 mm.) by distillation but not from acetophenone (B.P. 202° C./760 mm.). Sodium bisulfite, however, can be used to separate hydratropic aldehyde from acetophenone because both hydratropic aldehyde and benzaldehyde form water soluble adducts with sodium bisulfite while acetophenone does not form an adduct with sodium bisulfite. The acetophenone can then be extracted from such an aqueous adduct solution and the adduct regenerated by acidification or basification.

To 37.85 grams of the impure hydratropic aldehyde was added 650 milliliters of water and 50.5 grams (0.23 mole) of sodium pyrosulfite (87% pure). The mixture was stirred under a reflux condenser at 65–70° C. for 30 minutes, then cooled to 40–50° C. and was then stirred with 100 milliliters of benzene for 15 minutes. The benzene layer was separated. The aqueous layer again extracted with 50 milliliters of benzene. The benzene extracts were combined and washed with 10 milliliters of water, then rolled down on a Rinco film evaporator at 35° C./20 mm. of mercury to give 7 grams of residue that was found to be, by weight, 48% hydratropic aldehyde, 45% acetophenone, and 7% benzene.

To the aqueous layer was added 36.6 grams (0.35 mole) of sodium carbonate (dissolved in 100 milliliters of hot water) and 100 milliliters of benzene. The mixture was stirred for one hour at 65–70° C. The sodium carbonate/sodium bisulfite/hydratropic aldehyde mole ratio was 0.35/0.23/0.25. The mixture was cooled to 40–50° C., the benzene layer separated, and the aqueous layer extracted with 50 milliliters of benzene. The combined extract was washed with 10 milliliters of water, concentrated by use of a Vigreux column to a pot temperature of 90° C. and finally distilled in a 25-plate Podbielniak column at 730 millimeters to a pot temperature of 190° C. to get 29.1 grams of a residue that upon analysis was found to be 94% hydratropic aldehyde, 5% benzene, and 1% acetophenone by weight.

The aqueous layer was returned to the reactor and stirred with 100 milliliters of benzene for one hour at 65–70° C. The benzene layer was removed. The aqueous layer was re-extracted with 50 milliliters of benzene. The combined extract was washed with 10 milliliters of water and rolled down a Rinco film evaporator at 35° C./20 mm. of mercury to give 1.6 grams of a residue that by weight was 94% hydratropic aldehyde, 2% benzaldehyde, 1% acetophenone, and 3% benzene. The benzene was removed by further distillation to give a product of better than 98% pure hydratropic aldehyde.

From one mole of the linear dimer of styrene it is possible to obtain one mole of hydratropic aldehyde and one mole of benzaldehyde. The undesirable product acetophenone decreases the production of hydratropic aldehyde. The yield in this example was 77.5% of theory of benzaldehyde, 67.0% of theory of hydratropic aldehyde and 4.3% of theory of acetophenone.

EXAMPLE II

The procedure of Example I was again carried out except that a stirred mixture of 106 grams of 88–12 linear-cyclic dimer (0.45 mole of linear dimer), 720 milliliters of t-butanol and 67 milliliters of water were used in the ozonation instead of the aqueous acetone mixture. The ozonation was carried out at 25–30° C. for 4½ hours. Results better than those of Example I were obtained; the yield was 96.5% of theoretical yield of benzaldehyde, 76.5% of theoretical yield of hydratropic aldehyde, and 9.4% of theoretical yield of acetophenone.

EXAMPLE III

The procedure of Example I was carried out except that the adduct decomposition was accomplished by means of sulfuric acid. To this end, impure hydratropic aldehyde was separated by sulfuric acid. To the aqueous layer was added 28.2 grams (0.28 mole) of sulfuric acid in 60 milliliters of water and 100 milliliters of benzene, and the mixture was stirred for one hour at 65–70° C. The $H_2SO_4$-sodium bisulfite-hydratropic aldehyde mole ratio was 0.28/0.23/0.25. The subsequent handling procedure was the same as in Example I except that the benzene extracts were washed with 10 to 20 milliliters of aqueous potassium carbonate to remove acidity.

The hydratropic aldehyde recovered had about the same purity as in the above examples, but the total recovery was somewhat less.

The foregoing has described a novel method for producing hydratropic aldehyde from styrene. The hydratropic aldehyde is of high purity. Benzaldehyde is obtained as a co-product and this benzaldehyde is of high purity. The process is readily carried out and provides an economical process for the preparation of these compounds.

We claim:

1. A process for the preparation of hydratropic aldehyde from styrene which comprises dimerizing styrene to a linear dimer, ozonizing said styrene dimer to an ozonide, catalytically decomposing the ozonide, by contacting the ozonide with a palladium catalyst in an aqueous medium containing a material selected from the class consisting of lower aliphatic alcohols, wherein the alkyl group contains no more than 4 carbon atoms, acetone, tetrahydrofuran and dioxane, and separating the resulting benzaldehyde from the hydratropic aldehyde.

2. A process for producing hydratropic aldehyde which comprises ozonizing the linear dimer of styrene, decomposing the ozonide to predominately benzaldehyde and hydratropic aldehyde, by contacting the ozonide with a palladium catalyst in an aqueous medium containing a material selected from the class consisting of lower aliphatic alcohols, wherein the alkyl group contains no more than 4 carbon atoms, acetone, tetrahydrofuran and dioxane, and separating the hydratropic aldehyde from the benzaldehyde.

3. A process for producing hydratropic aldehyde which comprises dimerizing styrene by reacting styrene with aqueous surfuric acid to obtain a product that is predominately the linear dimer, ozonizing the linear dimer in an aqueous medium containing a material selected from the class consisting of lower aliphatic alcohols, wherein the alkyl group contains no more than 4 carbon atoms, acetone, tetrahydrofuran and dioxane to obtain an oxonide, decomposing the ozonide by contacting the ozonide with a palladium catalyst, in said aqueous medium distilling the decomposition product to separate the benzaldehyde from the hydratropic aldehyde, and removing the acetophenone impurity from the hydratropic aldehyde by the reaction of hydratropic aldehyde with sodium bisulfite.

4. A process for producing hydratropic aldehyde and benzaldehyde which comprises subjecting to ozone the linear dimer of styrene in an aqeous medium containing a material selected from the class consisting of lower aliphatic alcohols, wherein the alkyl group contains no more than 4 carbon atoms, acetone, tetrahydrofuran and dioxane to form an ozonide, and decomposing the ozonide in the presence of a palladium catalyst, in said aqueous medium to hydratropic aldehyde and benzaldehyde.

5. The process of claim 4 wherein the aqueous medium contains at least one mole of water per mole of linear dimer.

6. A process for the preparation of hydratropic aldehyde from styrene which comprises dimerizing styrene with sulfuric acid to a linear dimer, mixing said dimer with a solvent that is selected from the class consisting of lower aliphatic alcohols, wherein the alkyl group contains no more than 4 carbon atoms, acetone, tetrahydrofuran and dioxane and that contains at least one mole of water per mole of dimer, adding ozone to said mixture to ozonize the dimer, decomposing said mixture with a palladium catalyst in the presence of said solvent to hydratropic aldehyde and benzaldehyde and separating the aldehydes.

7. A process for the preparation of hydratropic aldehyde comprising, mixing the linear dimer of styrene with a solvent that is selected from the class consisting of lower aliphatic alcohols, wherein the alkyl group contains no more than 4 carbon atoms, acetone, tetrahydrofuran and dioxane and that contains at least one mole of water per mole of dimer, adding ozone to said mixture to ozonize the dimer, decomposing said mixture in said solvent with a palladium catalyst to hydratropic aldehyde and benzeldehyde, acetophenone being an undesired by-product, separating the benzaldehyde by distillation from the hydratropic aldehyde and acetophenone, removing the hydratropic aldehyde from the acetophenone by forming a water soluble adduct of the aldehyde with sodium bisulfite, and then decomposing the adduct to release the hydratropic aldehyde.

References Cited
UNITED STATES PATENTS

| | | | |
|---|---|---|---|
| 2,854,459 | 9/1958 | Knowles et al. | 260—339 |
| 2,898,350 | 8/1959 | Sturrock et al. | 260—599 XR |
| 3,067,205 | 12/1962 | Callighan et al. | 260—599 XR |
| 3,145,232 | 8/1964 | Thompson | 260—599 XR |

BERNARD HELFIN, *Primary Examiner.*